(12) United States Patent
Chou

(10) Patent No.: US 9,494,441 B2
(45) Date of Patent: Nov. 15, 2016

(54) PERSONALIZED ROUTE CALCULATION SYSTEM FOR A VEHICLE

(71) Applicant: Toyota Motor Engineering & Manufacturing North America, Inc., Erlanger, KY (US)

(72) Inventor: Warren Jing Po Chou, Ann Harbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/444,240

(22) Filed: Jul. 28, 2014

(65) Prior Publication Data

US 2016/0025509 A1    Jan. 28, 2016

(51) Int. Cl.
*G01C 21/34* (2006.01)
*G01C 21/36* (2006.01)

(52) U.S. Cl.
CPC ........... *G01C 21/3484* (2013.01); *G01C 21/36* (2013.01)

(58) Field of Classification Search
CPC .............................. G01C 21/3484; G01C 21/36
USPC ........................................................ 701/538
See application file for complete search history.

(56) References Cited

U.S. PATENT DOCUMENTS

| | | | |
|---|---|---|---|
| 7,668,654 B2 | 2/2010 | Pemble et al. | |
| 7,853,403 B2* | 12/2010 | Tanaka | G01C 21/3453 340/988 |
| 8,055,443 B1 | 11/2011 | Uyeki et al. | |
| 8,392,109 B2 | 3/2013 | Liotopoulos et al. | |
| 8,583,367 B2* | 11/2013 | Mineta | G01C 21/3469 340/539.2 |
| 2008/0065326 A1* | 3/2008 | Hoashi | G01C 21/20 701/432 |
| 2008/0294337 A1 | 11/2008 | Dawson et al. | |
| 2009/0210142 A1* | 8/2009 | Couckuyt | G01C 21/3461 701/532 |
| 2010/0088023 A1* | 4/2010 | Werner | A63B 24/0021 701/467 |
| 2011/0060495 A1* | 3/2011 | Kono | B60W 40/072 701/31.4 |
| 2012/0143492 A1 | 6/2012 | Johnson | |
| 2012/0179361 A1* | 7/2012 | Mineta | G01C 21/3676 701/410 |
| 2012/0179363 A1* | 7/2012 | Pierfelice | G01C 21/3461 701/423 |
| 2013/0018574 A1 | 1/2013 | Adler | |
| 2013/0096819 A1* | 4/2013 | Tarnok | G01C 21/00 701/428 |
| 2013/0218449 A1* | 8/2013 | Hymel | G01C 21/3647 701/408 |
| 2013/0245932 A1* | 9/2013 | Beaurepaire | G01C 21/3461 701/409 |
| 2014/0005924 A1* | 1/2014 | Letz | G01C 21/343 701/424 |
| 2014/0222330 A1* | 8/2014 | Kohlenberg | G01C 21/3484 701/425 |
| 2014/0236462 A1* | 8/2014 | Healey | G08G 1/0962 701/117 |
| 2014/0236472 A1* | 8/2014 | Rosario | G01C 21/3602 701/400 |

* cited by examiner

*Primary Examiner* — Rodney Butler
*Assistant Examiner* — Frederick Brushaber
(74) *Attorney, Agent, or Firm* — Christopher G. Darrow; Darrow Mustafa PC

(57) ABSTRACT

The personalized route planning system modifies a time or distance efficient route to a destination in response to a multiple of datasets to determine one or more personalized routes to the destination.

19 Claims, 5 Drawing Sheets

US 9,494,441 B2

PERSONALIZED ROUTE CALCULATION SYSTEM FOR A VEHICLE

BACKGROUND

The present disclosure relates to a vehicle, and more particularly, to a personalized route planning system therefore.

Vehicles often include computer-implemented mapping systems. The mapping systems typically include route planning applications to provide users with directions between different locations. The route planning application includes representations of roads and intersections and one or more algorithms to output a suggested route of travel. These algorithms can output routes depending upon user-selected parameters. For instance, a route planning application can enable a user to select a time efficient route, or a distance efficient route.

Over the last several years, users have grown to rely increasingly on route planning applications. Personalized tailoring of such routes, however, has been deficient.

SUMMARY

The personalized route planning system described herein modifies an efficient route to a destination in response to a multiple of datasets to determine a multiple of personalized routes to the destination. The personalized route planning system can also identify a characteristic travel pattern of the user to then determine a personalized route such that at least a portion of the personalized route includes the characteristic travel pattern of the user. The personalized route can also include avoidance of a predetermined area that the time efficient route otherwise passes through.

A method according to one non-limiting embodiment includes identifying a characteristic travel pattern of the user and planning a personalized route such that at least a portion of the personalized route is common to the characteristic travel patterns of the user.

A method according to another non-limiting embodiment includes planning an efficient route to a destination and modifying the efficient route in response to a multiple of datasets to determine a multiple of personalized routes to the destination. Each of the multiple of personalized routes to the destination are associated with at least one of the multiple of datasets and are displayed with a time to the destination, a distance to the destination, and a descriptor associated with respect to at least one of the multiple of datasets. At least one of the time to the destination and the distance to the destination for each personalized route is greater than a respective time to the destination and the distance to the destination for the efficient route.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

A personalized route planning system for a vehicle is disclosed. The personalized route planning system modifies an efficient route to a destination in response to a multiple of datasets to determine a multiple of personalized routes to the destination. Characteristic travel patterns of the user can also be used to determine a personalized route such that at least a portion of the personalized route is common to the characteristic travel pattern of the user. Each personalized route can include a time to the destination, a distance to the destination, and a descriptor associated with respect to at least one of the multiple of datasets. The personalized routes are thus personalized to user requirements but may not be the most efficient from a time and/or distance perspective.

Figure 1:
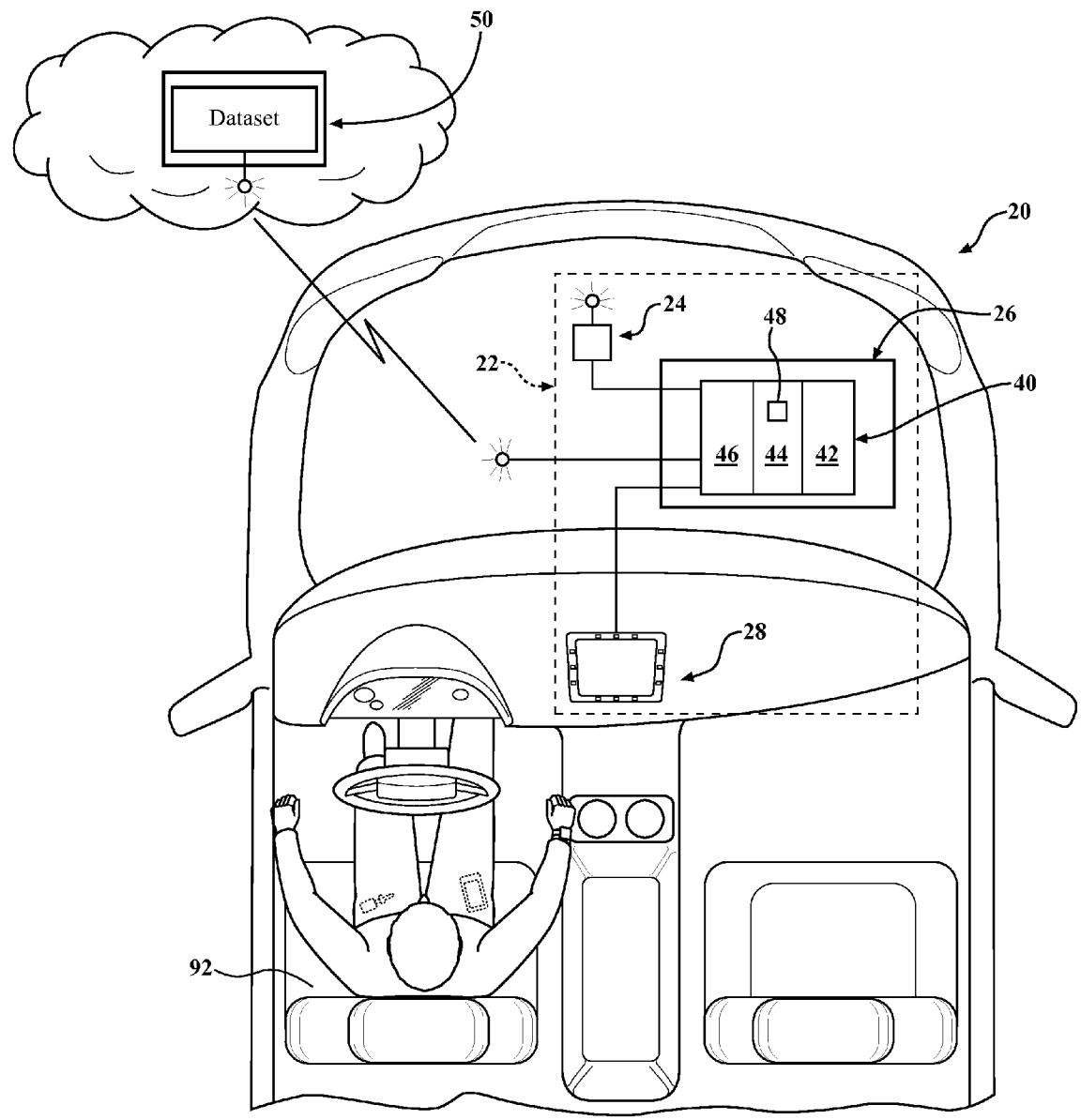
FIG. 1 is a schematic view of an example vehicle for use with a personalized route planning system.

FIG. 1 schematically illustrates a vehicle 20 with a personalized route planning system 22. The personalized route planning system 22 generally includes a navigation system 24, a control system 26, and a display system 28. It should be appreciated that although particular systems are separately defined, each or any of the systems may be otherwise combined or segregated via hardware and/or software within the personalized route planning system 22.

The control system 26 generally includes a computer module 40 with a processor 42, a memory 44, and an interface 46. The computer module 40 may be a portion of a central vehicle control, a stand-alone unit, or other system such as a cloud-based system. The processor 42 may be any type of microprocessor having desired performance characteristics. The memory 44 may include any type of computer readable medium that stores the data and control algorithms 48 described herein below. Other operational software for the processor 42 may also be stored in the memory 44. The interface 46 facilitates communication with other systems such as the navigation system 24, the display system 28, and other on board applications, and off board applications.

The navigation system 24 may include various sensors, such as a GPS system, operable to identify a location of the vehicle 20. The location of the vehicle, as well as directions to a desired destination, is displayed on the display system 28. Although illustrated in the non-limiting embodiments as being displayed upon a vehicle touch screen type display, it should be appreciated that the display pages may be implemented in any number of different electronic systems, display arrangements, and devices without departing from the spirit and scope of this disclosure.

Figure 2:
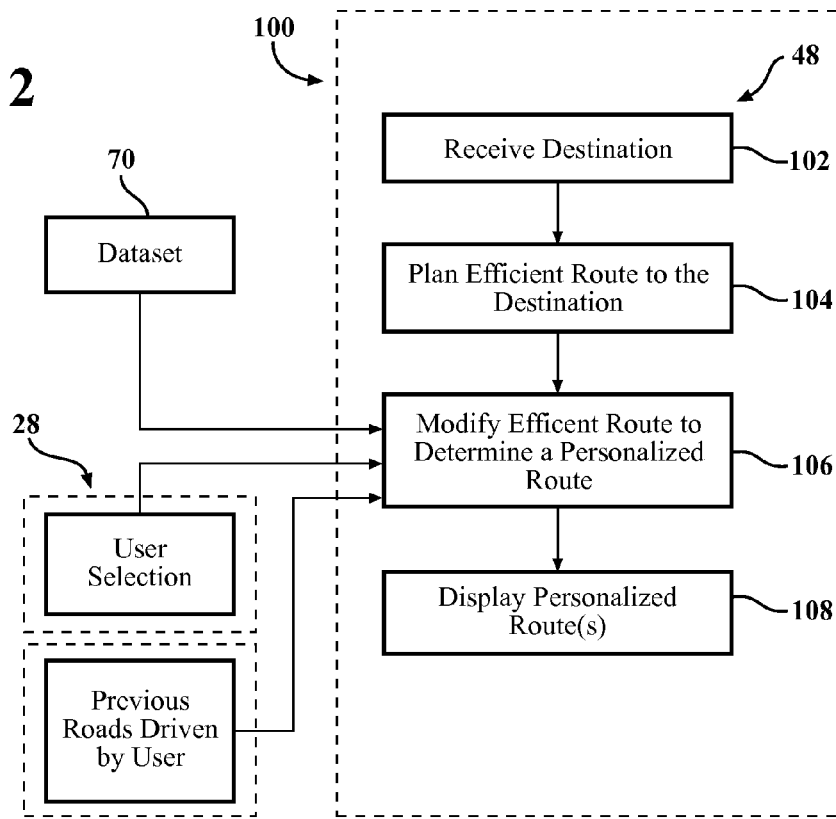
FIG. 2 is a flow chart illustrating operations of the personalized route planning system according to one disclosed non-limiting embodiment.

With reference to FIG. 2, in one disclosed non-limiting embodiment, an algorithm 48 for operation of the personalized route planning system 22 is schematically illustrated.

The functions of the algorithm 48 are disclosed in terms of functional block diagrams and it should be appreciated that these functions may be enacted in either dedicated hardware circuitry or programmed software routines as a computer readable storage medium capable of execution as instructions in a microprocessor based electronics control embodiment such as the control system 26. That is, the memory 44 is an example computer storage media having embodied thereon computer-useable instructions such as the algorithm 48 that, when executed, performs a method 100 of personalized route guidance.

The method 100 of personalized route guidance initially includes receiving a destination (step 102). The destination may be input into the personalized route planning system 22 by the user via the display system 28, or other human machine interface such as a personal electronic device. From the destination input, and the current location of the vehicle 20, the personalized route planning system 22 is operable to plan an efficient route to the destination (step 104). Various algorithms are commonly operable to plan route guidance via a time and/or distance efficient route to the destination. That is, the route to the destination may be initially planned in step 104 without regard to personalized requirements of the user. Alternatively, it should be appreciated that the steps may be combined such that the personalized route planning system 22 need not compute separate routes and may directly plan the personalized route.

Next, the personalized route planning system 22 modifies the efficient route to the destination in response to one or more user selections based on information from the dataset 50 (also illustrated schematically in FIG. 1) to determine a multiple of personalized routes to the destination (step 106). The dataset 50 may be off board of the vehicle 20 and may be remotely accessed by the personalized route planning system 22 via a cellular network, or other communication interface such as an application running on a cloud based system. Alternatively, the dataset 50 may be on board the vehicle 20 such as stored in the memory 44 or otherwise accessible by the processor 42.

The personalized route planning system 22 accommodates personal requirements of the user through information available from the dataset 50. The dataset 50 provides information that may change over time such as demographics, crime statistics, etc. The dataset 50 provides data to generate the one or more the personalized routes in response to user selections.

Figure 3:
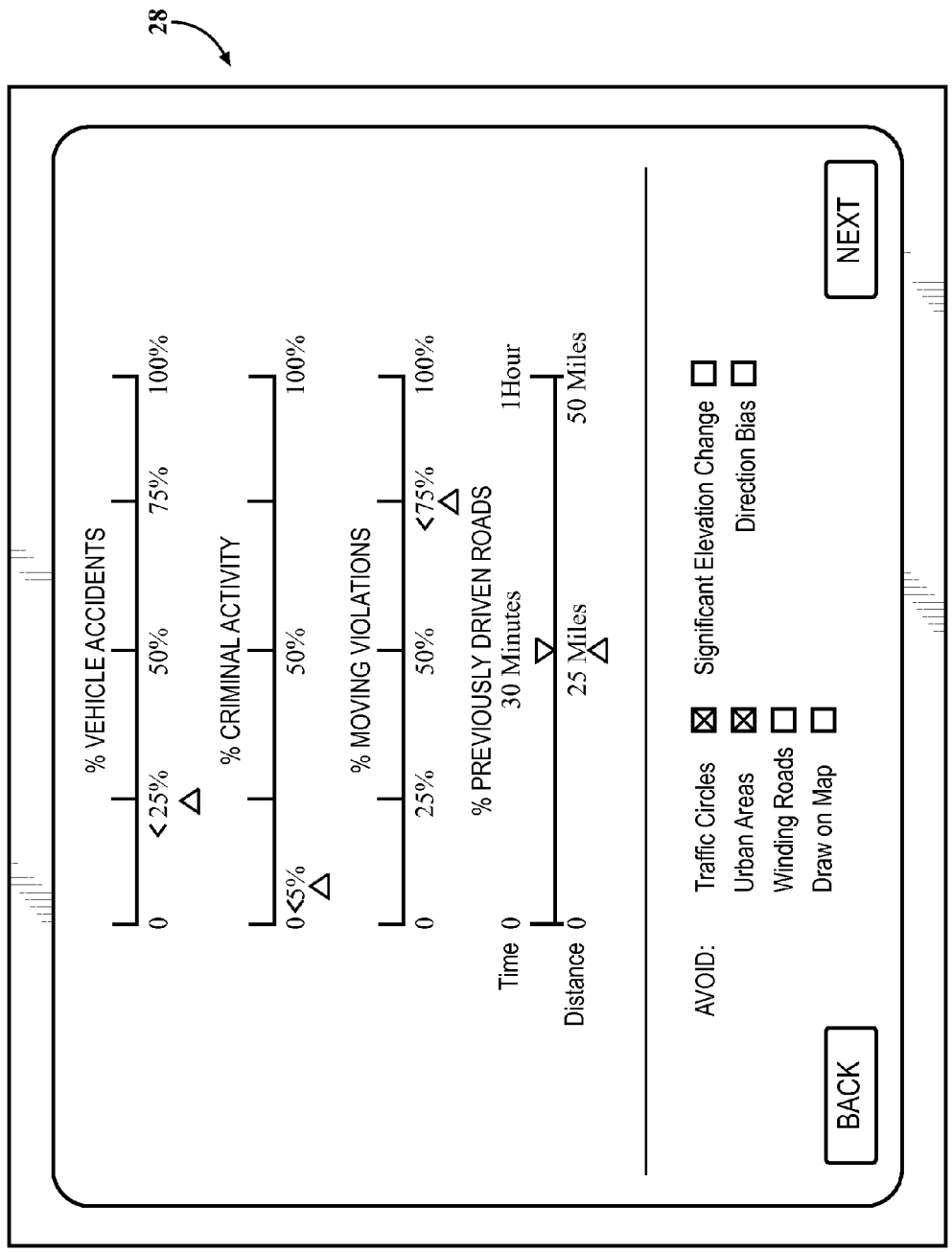
FIG. 3 is a page display of the personalized route planning system.

The efficient route to the destination calculated in step 104 is then modified into the personalized route through user selections, and data available in the dataset 50 for display to the user (Step 108). The user selections may be performed within the vehicle 20 utilizing the display system 28 via a menu slider, a checkbox, or other graphical user interface (FIG. 3). Alternatively, the user selections may be performed outside the vehicle 20 via a personal electronic device, computer, or other device in communication with the personalized route planning system 22.

In one example, the dataset 50 correlates each road with a frequency of vehicle accidents associated with the respective road such that the personalized route planning system 22 may plan a personalized route that avoids roads with a frequency of vehicle accidents above a predetermined, or a user selected, threshold. In other examples, the dataset 50 correlates each road with a frequency of criminal activities along the respective road, a frequency of moving violations along the respective road, demographics along the respective road, an elevation changes along the respective road, a straightness of the respective road, and/or other relationship, and/or combinations thereof. The frequency may be based upon a percentage with respect to a national average, state average, county average, or other such metric. Alternatively, the frequency may be based upon a numerical value of incidents or other relationship that conveys the data from the dataset 50 such that the user may readily make selections based upon such data (FIG. 3). Such personalized routes are thus personalized to user requirements but may not be the most efficient route from a time and/or distance perspective to the destination.

Figure 4:
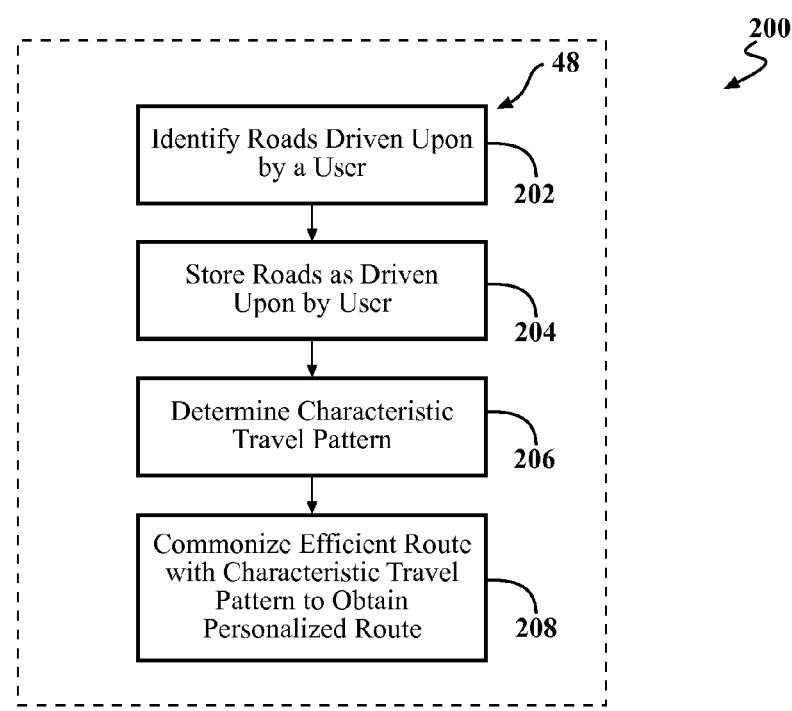
FIG. 4 is a flow chart illustrating operations of the personalized route planning system according to one disclosed non-limiting embodiment.

With reference to FIG. 4, in another disclosed non-limiting embodiment, a method 200 of personalized route guidance identifies roads driven upon by a user (Step 202), and stores these roads in the dataset 50 and/or the memory 44 (Step 204). That is, as the vehicle 20 is driven, the personalized route planning system 22 stores the roads driven upon to determine a characteristic travel pattern of the user (step 206). The characteristic travel pattern of the user may further include data associated with the frequency of specific road usage, the amount of time on each road, the compass direction that the user generally travels with respect to the user's home, and other such data. The user may alternatively, or additionally, preselect preferred roads, areas, geographic locations, and features to facilitate refinement of the characteristic travel pattern of the user.

The personalized route planning system 22 can then determine a personalized route (Step 208) such that at least a portion of the personalized route is common to the characteristic travel patterns of the user. That is, the personalized route planning system 22 will match the personalized route with at least one of the roads of the characteristic travel patterns of the user to a preset or desired degree based on a maximum portion of the personalized route common to the characteristic travel patterns of the user.

In one example, if the user travels a particular route from home to a destination that may not be the most efficient route, but comports with characteristic travel patterns of the user, the personalized route planning system 22 will plan the return route home in accords with the previously traveled route rather than the most efficient route.

The user of the personalized route planning system 22 may also define the maximum portion of the personalized route by a selected, or predetermined, increase in travel time between the personalized route and the efficient route, a selected, or predetermined, increase in distance between the personalized route and the efficient route, or other relationship. For example, the user of the personalized route planning system 22 may define 30 minutes to be the limit between the personalized route and the time efficient route such that the personalized route planning system 22 will plan a personalized route common to the characteristic travel patterns of the user that may increase the time to the destination by up to about 30 minutes. Alternatively, or in addition, the personalized route planning system 22 may identify a compass direction with respect to a user's home that the user often travels, and thereby determines the personalized route that is generally directed in such direction.

Alternatively, or in addition, the personalized route is defined at least in part by avoidance of a predetermined area that the efficient route may otherwise pass through. The predetermined area may be an area such as an intersection with a predetermined frequency of vehicle accidents, a predetermined frequency of vehicle traffic citations, and/or other such area. The predetermined area may also be a city, neighborhood, intersection, or other map area with a predetermined frequency of criminal activity. Sill other predetermined areas may be areas with particular road geometry such as traffic circles, roads that are complicated or stressful to navigate, roads with significant elevation change, roads that are winding, or other roads above or below a selected, or predetermined, threshold. Conversely, predetermined areas may be specifically selectable to provide the user with an exciting drive experience.

Figure 5:
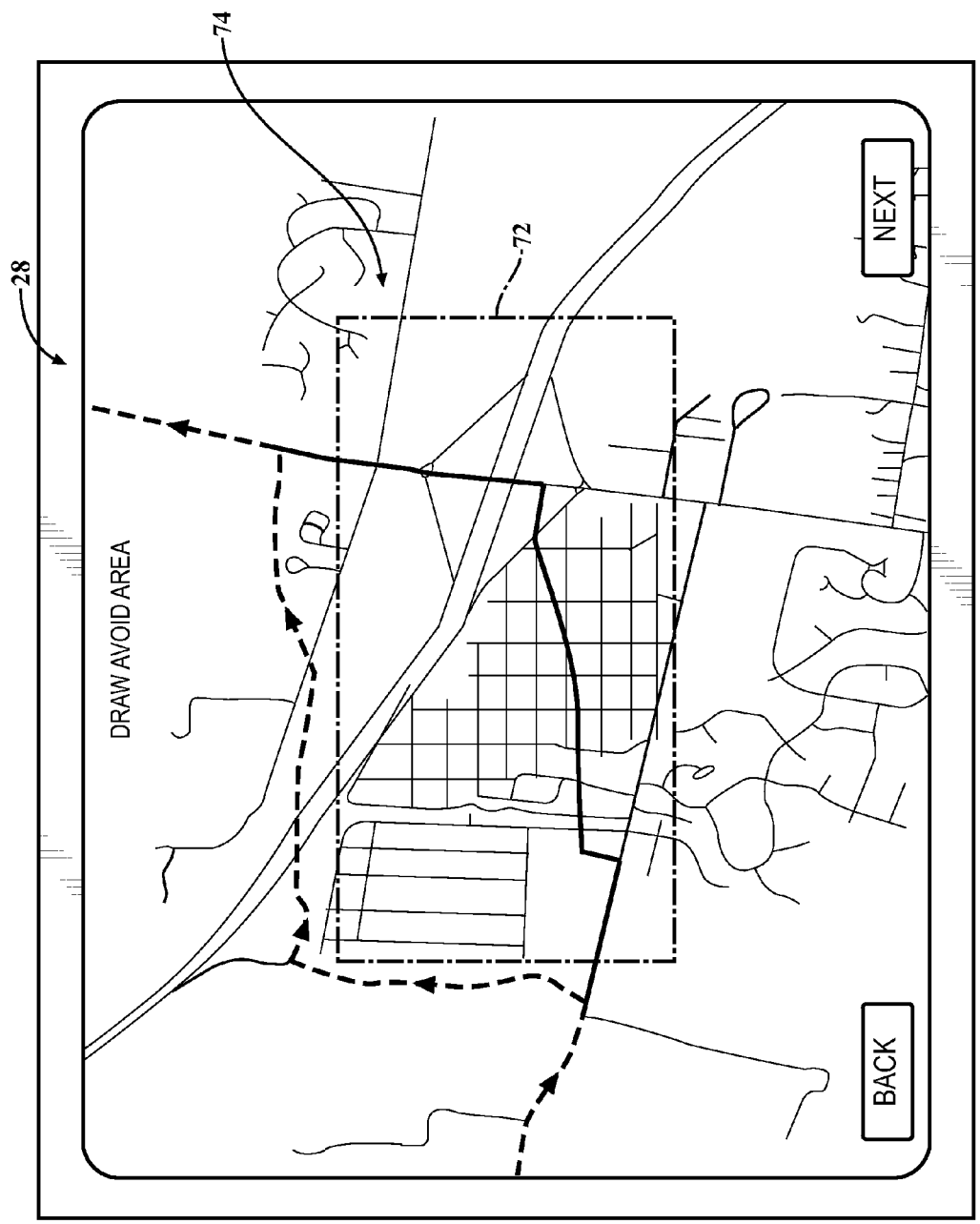
FIG. 5 is another page display of the personalized route planning system.

With reference to FIG. 5, in another disclosed nonlimiting embodiment, the user can designate an area 72 on a map 74 so as to designate that which is to be avoided for the personalized route. The area 72 may be drawn on the map 74 via a touchscreen or other input device associated with the display system 28 such as a keypad. It should be appreciated that although a rectilinear area is illustrated, other areas such as a circular or multi-sided area 72 may be drawn or otherwise designated.

Figure 6:
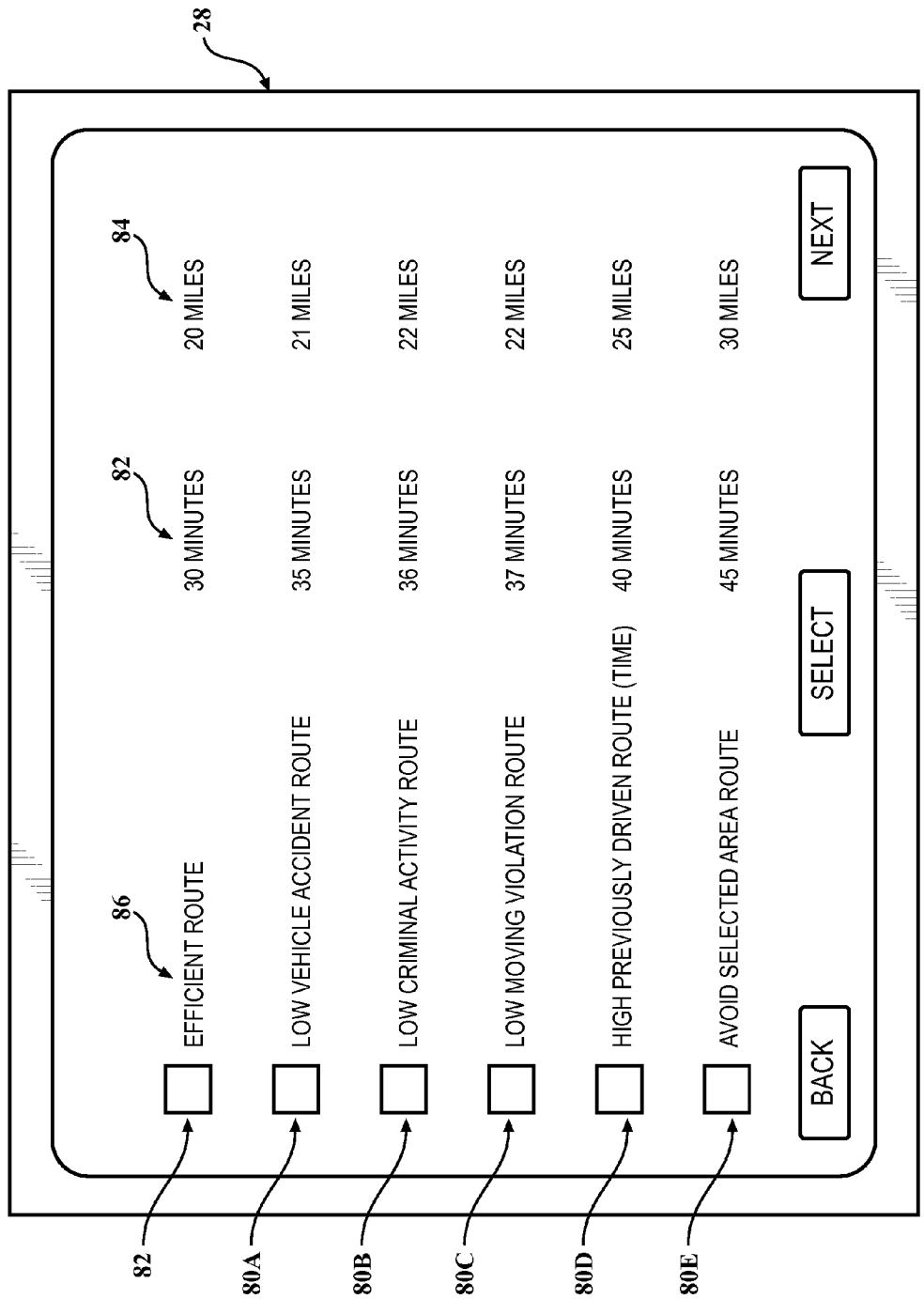
FIG. 6 is another page display of the personalized route planning system.

With reference to FIG. 6, the personalized routes 80A-80E (five shown for example only) are then displayed by the display system 28. Each personalized route 80A-80E to the destination can include a time 82, a distance 84, and a descriptor 86 associated with respect to at least one of the multiple of datasets 50. The efficient route 82 may also be listed for ready comparison to the personalized routes 80A-80E.

The personalized routes 80A-80E may be individually selected, or selected in combination, to provide a personalized route that, for example, includes both a low criminal activity frequency, low traffic citation frequencies.

The use of the terms "a," and "an," and "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. The use of the terms "component," "module," "system," "interface," or the like are generally intended to refer to a computer-related entity, either hardware, a combination of hardware and software, software, or software in execution.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined at least in part by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A non-transitory computer storage media having embodied thereon computer-useable instructions that, when executed, perform a method, the method, comprising:
   receiving a destination;
   planning an efficient route to the destination, the efficient route to the destination including a time to the destination and a distance to the destination;
   modifying the efficient route to the destination based on a multiple of datasets to determine a multiple of personalized routes to the destination, each of the multiple of personalized routes to the destination associated with different respective at least one of the multiple of datasets, and including a time to the destination, a distance to the destination, and a descriptor for its respective associated at least one of the multiple of datasets, with at least one of the time to the destination and the distance to the destination being greater than that for the efficient route to the destination;
   displaying, together, the efficient route to the destination and, for selection by a user, each of the multiple of personalized routes to the destination, including, for each of the multiple of personalized routes to the destination, its time to the destination, its distance to the destination, and its descriptor for its respective associated at least one of the multiple of datasets;
   receiving, from the user, a selection of a multiple of the displayed multiple of personalized routes to the destination; and
   combining the selected multiple of the displayed multiple of personalized routes to the destination into a combined personalized route to the destination.

2. The method as recited in claim 1, wherein one of the multiple of personalized routes to the destination is defined at least in part by avoidance of a predetermined area through which the efficient route passes.

3. The method as recited in claim 2, wherein the predetermined area is an area with at least one of a predetermined frequency of vehicle accidents, a predetermined frequency of criminal activity, a particular road geometry, and a particular elevation.

4. The method as recited in claim 1, wherein at least one of the multiple of datasets is an off board dataset.

5. The method as recited in claim 1, wherein at least one of the multiple of datasets is a dataset that correlates potential roads to the destination with a frequency of vehicle accidents associated with those roads.

6. The method as recited in claim 1, wherein at least one of the multiple of datasets is a dataset that correlates potential roads to the destination with a frequency of criminal activities along those roads.

7. The method as recited in claim 1, wherein at least one of the multiple of datasets is a dataset that correlates potential roads to the destination with a frequency of moving violations along those roads.

8. The method as recited in claim 1, wherein:
   at least one of the multiple of datasets is a previously driven road dataset that correlates potential roads to the destination with a characteristic travel pattern of the user, and one of the multiple of personalized routes to the destination is a high previously driven route to the destination associated with at least the previously driven road dataset.

9. The method as recited in claim 8, wherein the high previously driven route to the destination is determined such that at least a portion of the high previously driven route to the destination is common to the characteristic travel pattern of the user.

10. The method as recited in claim 9, wherein a maximum portion of the high previously driven route to the destination is common to the characteristic travel pattern of the user.

11. The method as recited in claim 10, wherein the maximum portion of the high previously driven route to the destination is defined at least in part by a predetermined increase in time between the high previously driven route to the destination's time to the destination and that for the efficient route to the destination.

12. The method as recited in claim 8, further comprising: identifying the characteristic travel pattern of the user.

13. The method as recited in claim 12, wherein the identifying is defined at least in part by a frequency of use of each road of a multiple of roads of the characteristic travel pattern of the user.

14. The method as recited in claim 12, wherein the identifying is defined at least in part by a time that the user drives upon each road of a multiple of roads of the characteristic travel pattern of the user.

15. The method as recited in claim 12, wherein the identifying is defined at least in part by a compass direction with respect to the user's home.

16. The method as recited in claim 12, wherein the identifying is defined at least in part by an input by the user.

17. The method as recited in claim 1, wherein the modification is in response to a multiple of user selections.

18. The method as recited in claim 17, wherein each of the multiple of personalized routes to the destination accommodates at least one of the multiple of user selections.

19. The method as recited in claim 18, wherein the combined personalized route to the destination accommodates those of the multiple of user selections accommodated by the selected multiple of the displayed multiple of personalized routes to the destination.

* * * * *